(12) United States Patent
Wallace

(10) Patent No.: US 6,252,887 B1
(45) Date of Patent: Jun. 26, 2001

(54) CELL TO FRAME CONVERSION MANAGEMENT

(75) Inventor: Malcolm Wallace, Bishops Stortford (GB)

(73) Assignee: Northern Telecom Limited, Quebec (CA)

(*) Notice: Subject to any disclaimer, the term of this patent is extended or adjusted under 35 U.S.C. 154(b) by 0 days.

(21) Appl. No.: 09/014,956

(22) Filed: Jan. 28, 1998

(51) Int. Cl.[7] .................................................. H04J 3/16
(52) U.S. Cl. ................................. 370/466; 370/474
(58) Field of Search ................................ 370/229, 395, 370/401, 410, 412, 445, 471, 466, 474, 473

(56) References Cited

U.S. PATENT DOCUMENTS

| 5,420,858 | | 5/1995 | Marshall et al. . | |
|---|---|---|---|---|
| 5,459,723 | * | 10/1995 | Thor | 370/60 |
| 5,490,140 | | 2/1996 | Abensour et al. . | |
| 5,528,590 | | 6/1996 | Iidaka et al. . | |
| 5,809,012 | * | 9/1998 | Takase et al. | 370/229 |
| 5,848,354 | * | 12/1998 | Kamalski | 455/38.1 |

FOREIGN PATENT DOCUMENTS

| 593843 | 4/1994 | (EP) . |
|---|---|---|
| 9326107 | 6/1993 | (WO) . |
| 9724842 | 12/1996 | (WO) . |

\* cited by examiner

*Primary Examiner*—Chau Nguyen
*Assistant Examiner*—Alexander O. Boakye
(74) *Attorney, Agent, or Firm*—Malin, Haley & Dimaggio, P.A.

(57) ABSTRACT

A method and apparatus is disclosed for providing an interworking function to interface a frame relay LAN to an ATM network. Data from a broadband packet switched data data communications network which uses data packets of a fixed size is transferred to a narrow-band packet switched network which uses data packets of variable size by queuing input fixed length data packets data packets of variable size; processing the data payloads of said input data packets received from said queue to line-encode said data so it may be transmitted in said data packets of variable size; and generating output fixed length data packets of the same size as the input fixed-length data packets for transmitting said processed data payloads to a fixed-length to variable lengh data packets conversion device. The generating step comprises holding any input data packet in said input queue until all its data payload has been processed and passed into a said output data packet and reprocessing the input data packet in the event that not all of its data payload has been so passed whereby the remainder of the data payload of said held packet is passed to the next output data packet.

9 Claims, 3 Drawing Sheets

CELL TO FRAME CONVERSION MANAGEMENT

The present invention relates to a method of cell to frame conversion management for packet-switched data communications, and more particularly to a method of managing the conversion between Asynchronous Transfer Mode (ATM) cells and Frame Relay frames without the need for providing intermediate buffering of the converted data packets.

Frame Relay is a connection-oriented, variable bit-rate protocol which is widely used to provide Local Area Network (LAN) and LAN-Interconnect Services. Frame Relay uses a unit of data called a frame, which may be of variable length depending upon the amount of data to be transmitted, and the characteristics of the network to be used. However, a fundamental characteristic of frame relay which is of the utmost importance in the context of the present invention is that consecutive frames transmitted on the same network may be of markedly different sizes.

Asynchronous Transfer Mode (ATM) which may also be referred to as Cell Relay, is a connection-less variable bit-rate architecture which corresponds approximately to layers 1 and 2 of the Open Systems Interconnection (OSI) reference model for data communications. ATM uses a unit of data called a cell, which is of a fixed size of 53 octets. The individual functions of each octet within an ATM cell as to whether they carry network control and addressing information, error checking information or the actual data payload are determined by the ATM Adaptation Layer (AAL) protocols which correspond approximately to layers 2 and 3 of the OSI reference model. There are currently several different AALs which each provide different functions and services, however in the context of the present invention it is merely important that it is understood that all ATM cells must be of a fixed size, no matter which adaptation layer is to be used.

ATM has recently emerged as the architecture of choice for the next-generation broadband networks, as it has proved to be extremely versatile in handling different volumes and types of network traffic, including packetised voice and video traffic as well as the more traditional data communications. Although predominantly providing connection-less protocols, a connection-oriented service may be provided though the use of the Service Specific Connection Oriented Protocol (SSCOP) The provision of Virtual Channels (VC) and Virtual Paths (VP), used in conjunction with advanced traffic policing and shaping algorithms enabling ATM to appear as if it is able to reserve bandwidth on a network and thus guarantee high-speed, low-error rate data communications.

There is a requirement for the emerging ATM broadband networks to interwork with existing narrow-band LAN services, and an interworking function is therefore required between the LAN and the ATM network. WO 93/26107 relates to an "ATM-ETHERNET portal/concentrator" which allows for transparent connection of an ETHERNET type LAN into an ATM network. By using a double port memory the construction becomes simple, the processor power slight, and the capacity high as there is no need to copy data cells.

WO 95/00829 discloses a device for providing a bridge from a LAN into an ATM network, which uses the AAL5 protocol. The bridges make use of a connection-less data services function by means of Broadband Data Service Servers (BDS) to provide transmission to and from the LAN without buffering. The device is particularly adapted for providing IP over an ETHERNET LAN, and preferably the respective local network will be connected via only one BDS, while the transmission in the BDS network is in streaming mode.

The present invention is aimed at providing an interworking function to interface a frame relay LAN to an ATM network. According to the present invention a method of transferring data from a broadband packet-switched data communications network which uses data packets of a fixed size to a narrow-band packet-switched data communications network which uses data packets of variable size, comprising the steps of:

queuing input fixed length data packets;

processing the data payloads of said input data packets received from said queue to line-encode said data so it may be transmitted in data packets of variable size;

generating output fixed-length data packets of the same size as the input fixed-length data packets for transmitting said processed data payloads to a fixed-length to variable length data packets conversion device;

wherein the generating step comprises holding any input data packet in said input queue until all its data payload has been processed and passed into a said output data packet and reprocessing the input data packet in the event that not all of its data payload has been so passed whereby the remainder of the data payload of said held packet is passed to the next output data packet.

An advantage of the present invention is that it removes the need for a separate buffer to store the output of the cell to frame conversion by making use of a cell queueing function. This saves critical board space by removing not just the memory itself, but also the associated controller logic and context memory for that logic. Board area savings are critical within the field of high density interface applications, reducing the cost of, minimising the manufacturing steps required for, and improving the reliability of each board.

A further advantage of the present invention is that due to the lack of cell buffering, generic processing hardware blocks consisting of an FPGA, Processor, and context memory can be used to provide conversion in each direction ie. from the cell to frame and vice versa. There are many data communications applications which could make use of such a module and re-use saves both design effort and manufacturing costs. The next generation FPGAs may incorporate gate array structures integrated with the processor and memory on a single IC, thus making the generic processing block of the present invention more attractive.

Further features and advantages of the present invention will become apparent from the following description and with reference to the accompanying drawings, wherein.

Figure 4:
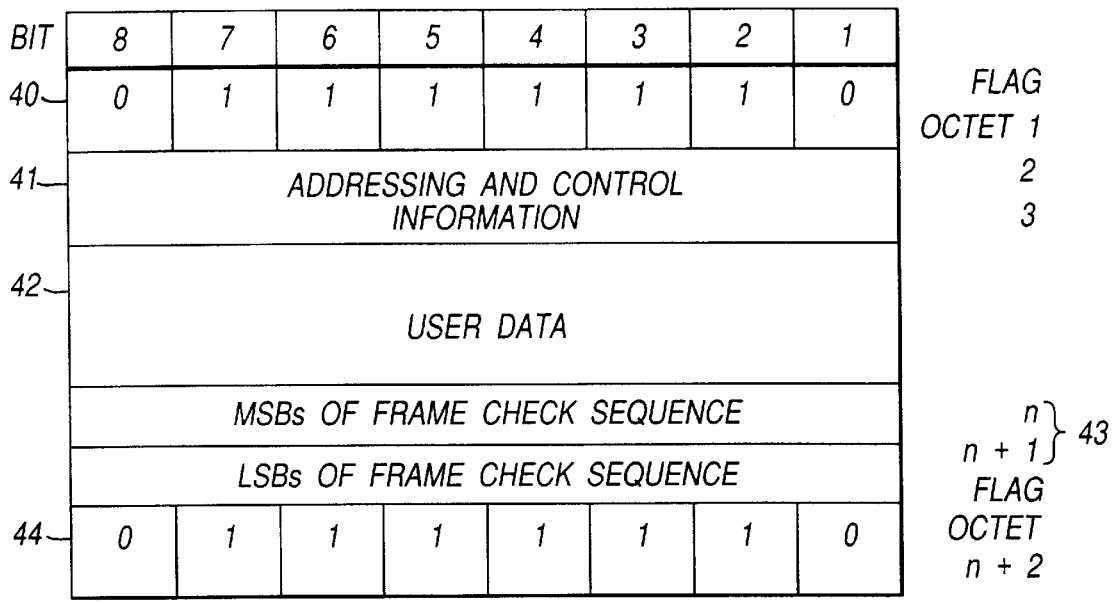
Figure 5:
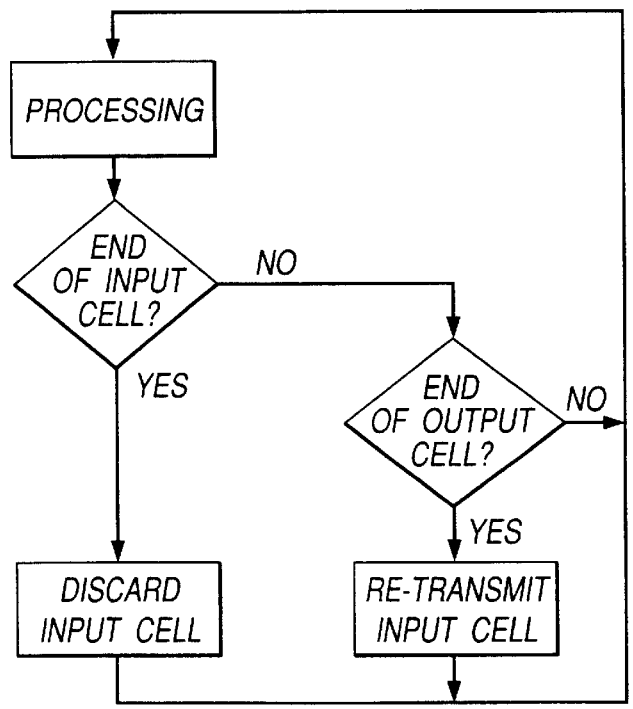
Figure 6:
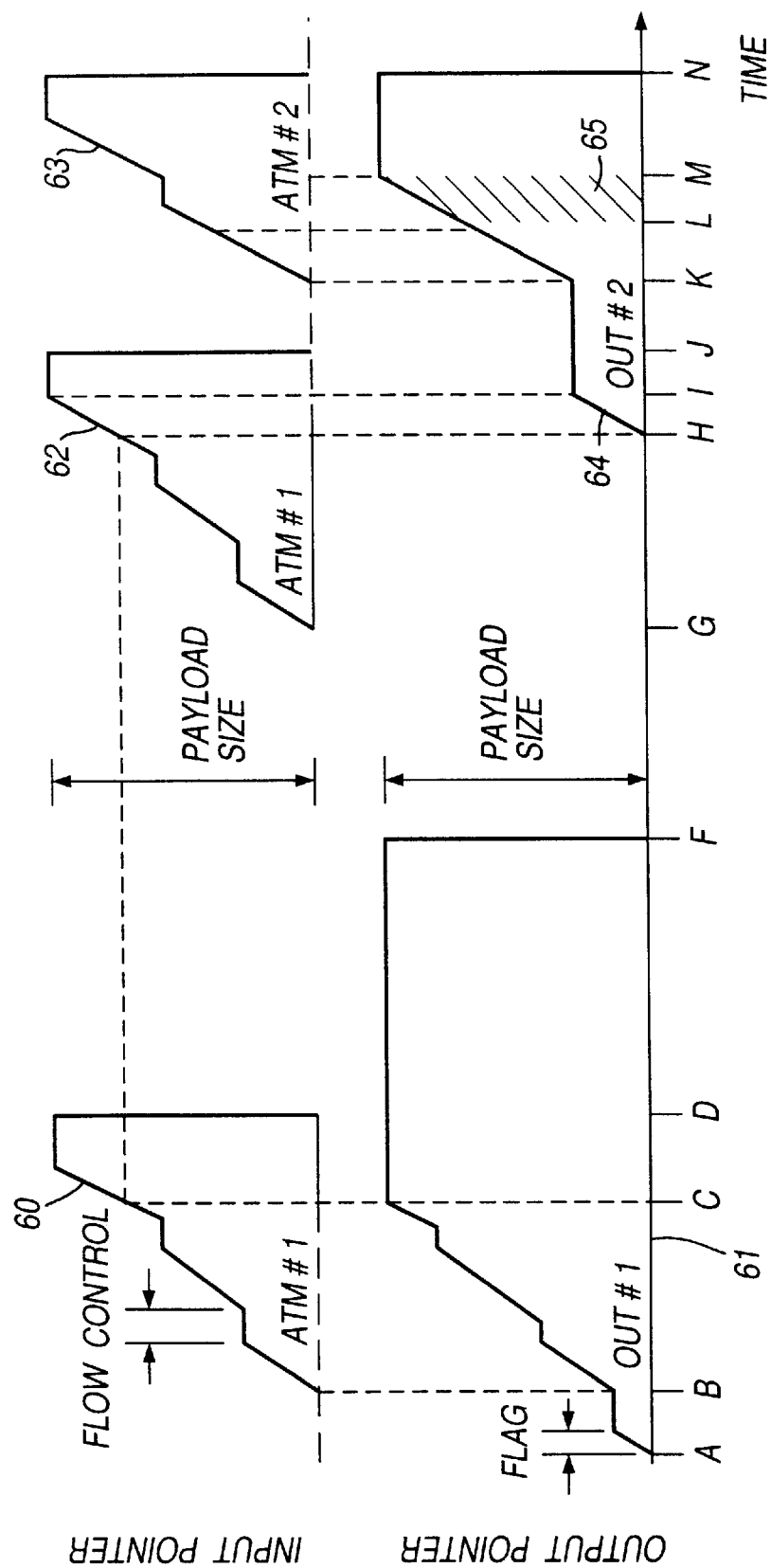

FIG. 4 details the structure of a frame relay frame, and in particular the header and trailer octets which delimit the frame;

FIG. 5 shows a flow diagram detailing the process flows of the present invention; and FIG. 6 shows a diagram of the cell-to-frame conversion process.

The present invention provides a novel means of converting from ATM fixed-length cells to variable-length frame relay frames without the need for buffering the converted data packets. This can dramatically save on printed circuit space of the constructed circuit, which is an important consideration within high-density interfacing applications.

Figure 1:
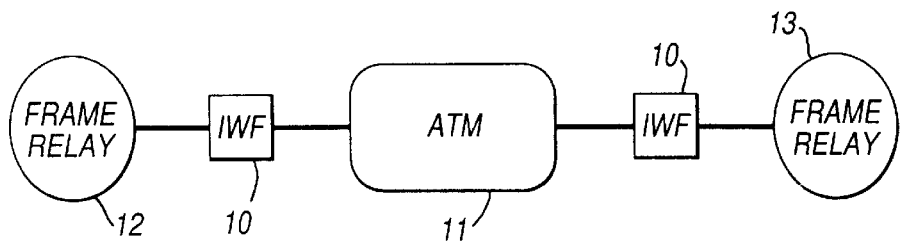
FIG. 1 shows a block diagram of how the interworking function of the present invention may interconnect two frame relay LANs via a broadband ATM network.

ATM broadband networks are increasingly being used to connect two or more frame relay LANS together. FIG. 1 shows a block diagram of how this may be achieved. A frame relay LAN 12 is connected to the ATM network 11 through the interworking function 10 of the present invention. The interworking function 10 as a whole provides for appropriate cell-to-frame and frame-to-cell conversion as defined by Recommendation 1.555 "Frame Relaying Bearer Service Interworking" of the International Telecommunications Union. The data are transmitted through the ATM network as ATM cells and arrive at a second identical interworking function 10 which performs the cell to frame conversion for a second frame relay LAN 13.

Figure 2:
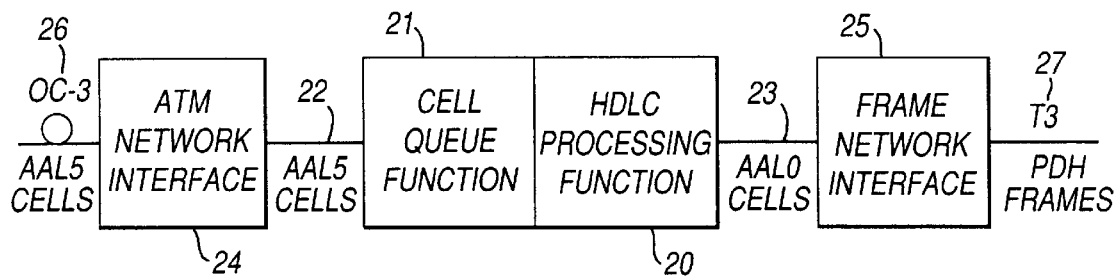
FIG. 2 shows a block diagram of the interworking function used to convert from ATM cells to frame relay frames (cell-to-frame)

The components of the interworking function 10 are shown in more detail in FIG. 2. The interworking function of the present invention is built as a server entity, and communicates to each network interface entity using ATM cells as a standard interconnect medium. Each network interface entity (24, 25) sends and receives data over proprietary serial interconnects 22 and 23.

The ATM network interface 24 uses a physical OC-3 connection 26 into the ATM network. The protocol used within the broadband ATM network is that of AAL5, and AAL5 ATM cells received over the ATM network interface are routed to the interworking functions 21 and 20 via an ATM switch (not shown). AAL5 cells which are travelling in the opposite direction, egressing from the LAN to the broadband network, are sent to the ATM network over the physical OC-3 link.

In the cell-to-frame (ATM to frame relay) direction used for ingressing data, cells received by the interworking function are first queued until a whole frames worth of data has been acquired. This is to guarantee the availability of a suitable amount of frame data at the frame network interface, as once a frame has begun transmission onto the LAN it cannot be interrupted until the entire frame has been transmitted. A scheduling function is used to ensure that AAL5 cells are read from cell queues within the cell queue function at an average rate which matches the fixed bandwidth of the communication channel 27 on the physical link from the frame network interface 25. These AAL5 cells are then received at the High-Level Data Link Control (HDLC) processing function 20 for conversion.

Frame relay uses the HDLC protocol to delimit a frame of data using a unique binary pattern. The structure of a frame relay frame is shown in FIG. 4, whence it can be seen that the frame delimiting octets 40 and 44 take the form of a 0 bit followed by six contiguous 1 bits, followed by a 0 bit. All the other octets within the frame carrying the network addressing and control information 41, the data payload 42 and the frame check sequences 43 must be contained between the header and trailer octets 40 and 44, and the unique pattern of these octets must not be repeated within the frame data. HDLC uses a line-encoding process to ensure that the pattern cannot occur whereby a 0 bit is inserted after each series of 5 contiguous 1 bits which occur within the frame data. The net effect of this process is to increase the size of the transmitted data, that is, the same information in frame relay format consists of more data bits than the equivalent information in ATM format, due to the line-encoding process adding in the 0 bits.

Returning to FIG. 2, the HDLC processing function 20 performs the HDLC line-encoding procedures on the data payloads contained within the AAL5 cells received from the cell queue function, and outputs the HDLC encoded data as unstructured ATM cells using ATM adaptation layer 0. The AAL0 cells data payload now contains the line-encoding 0 bits after any series of 5 contiguous 1 bits, and so there can be no direct mapping between the AAL5 cells input to the cell queuing function 21, and the AAL0 cells output from the HDLC processing function 20, as the AAL0 data payloads now contain the extra 0 bits. It is important that it is understood that the HDLC processing function processes the data payloads of the AAL5 ATM cells into a format that is suitable for transmission by frame relay ie. the payloads are line-encoded, but that the processed data payloads are then output as ATM AAL0 cells. This is considered as one of the main features of the present invention. The conversion of the AAL0 cells carrying the frame relay compatible line-encoded data is performed by the frame network interface 25 which outputs frame relay frames onto the LAN via a physical T3 link 27. The precise mapping and conversion operations required to convert from ATM to frame relay and vice versa are defined by internationally agreed standards and conventions such as the previously mentioned Recommendation 1.555 of the ITU-T, and it is to be understood that these mapping operations are not claimed as part of the present invention.

A detailed description of the HDLC processing function will now be undertaken and explanation made to how the present invention is able to perform the HDLC line encoding without additional buffering required at the output.

Figure 3:
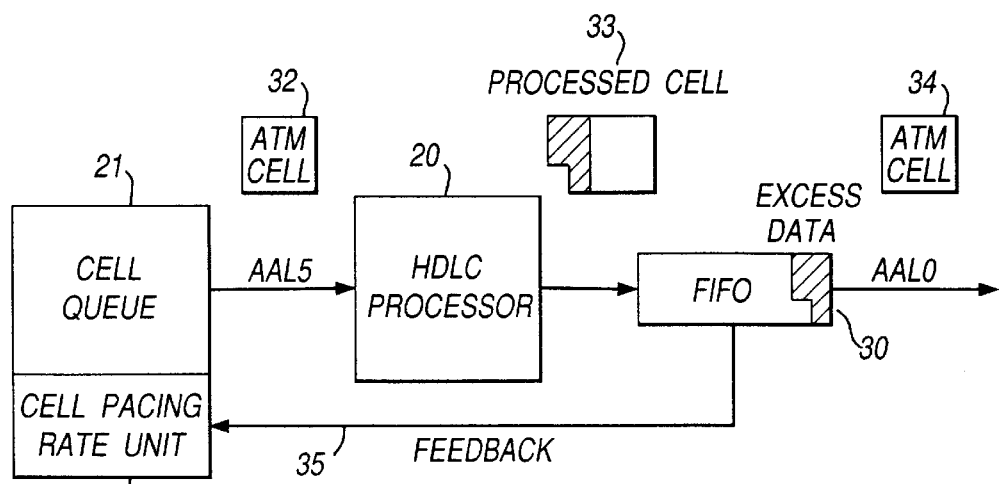
FIG. 3 shows a block diagram of another solution to the problem which the present invention addresses.

As mentioned, the HDLC line encoding process increases the size of the data by inserting 0 bits. The excess data created must be stored since the frame interface expects a fixed average data rate delivered in fixed data units (AAL0 ATM cells). One solution of the problem is to write the processed data into a first-in-first-out (FIFO) memory unit and read the fixed size AAL0 cells out of this at the fixed bandwidth rate of the channel 23. This solution is shown in block diagram form in FIG. 3.

ATM cells using AAL5 (32) are sent from the cell queue 21 to the HDLC processor 20. The HDLC processor line-encodes the data, adding the excess data as shown by 33. The line-encoded data is then stored in the FIFO 30, from where it is read out as AAL0 ATM cells. A low bandwidth feedback communication channel 35 must be maintained between the FIFO and a cell pacing rate unit 31 to control the rate of which the cell queueing function sends cells to the HDLC processor, in order to prevent the FIFO from overflowing. The main disadvantage of this arrangement is that the FIFO itself, the feedback communications channel, and the cell pacing rate unit will require extensive PCB space which may be saved by using the method of the present invention.

The present invention overcomes the problems of the previously described solution by recognising that the excess data generated by the HDLC processor need not be buffered before conversion and transmission as Frame Relay but instead can be regenerated from the original input cells held within the cell queuing function. This obviates the need for storage at the output of the HDLC processor by making use of the already existing cell queue function memory instead. This is achieved as follows.

Two pointers are maintained within the HDLC processing function. The first, the input pointer, counts each data bit input from the incoming AAL5 cell. The second, the output pointer, counts each line-encoded data bit, including the HDLC 0-bits, output as the data payloads of the outgoing AAL0 cells. The values of these pointers are decoded in order to create instructions which are fed back from the HDLC processing function to the cell queue function, informing it whether to discard the current cell or retain it for retransmissions back to the HDLC function. A flow diagram for the cell feedback instruction generation procedure is shown in FIG. 5, and a diagram of the retransmission procedure in FIG. 6.

With reference to FIG. 6, ATM AAL5 cell #1 (60) contains the start of a frame which has been transmitted from a remote first LAN over the broadband ATM network and is being received by a second local LAN. The stored input pointer, the input pointer and output pointer values are initialised to zero. At time A, an HDLC flag is added to the output cell 61 to delimit the start of the frame, and the output pointer is incremented. Reception of the ATM cell #1 (60) begins at time B. Cell payload data is added to the output cell payload once the output pointer has reached the stored threshold. Since the pointer value was initialised to zero the processed line encoded ATM payload from the input AAL5 cell is immediately added to the output AAL cell payload. OUT cell #1 61 becomes full at time C, before the ATM cell #1 60 has been fully processed. This is due to the HDLC zero-insertion, and the addition of a start flag. At this point the value of the input pointer which points to the next bit to be processed is stored in local context memory and the ATM cell #1 is acknowledged back to the cell queue function as being required for retransmission. The OUT cell #1 61 is transmitted as an AAL0 ATM cell to the frame network interface for conversion into frame relay format and transmission onto the LAN. Note that the payload does not require any further processing as this has been performed by the HDLC function of the present invention.

ATM cell #1 is retransmitted at time G (62), and the input pointer initialised to zero. The payload data bits are processed by the HDLC function and the input pointer incremented each bit but as the input pointer value has yet to reach the stored value, no data is output to the AAL0 output cell OUT #2 (64). The input pointer reaches the stored threshold at time H and this triggers the start of the output cell OUT #2 64, which acquires the remainder of the processed ATM cell #1. Since all of the ATM cell #1 has now been completely processed it is acknowledged back to the cell queue function as to be discarded, and this occurs at time J.

ATM cell #2 (63) starts being processed at time K, and its processed line-encoded payload may be added to the output cell OUT #2, until OUT #2 is full, in which case the content of ATM #2 would be processed into a third AAL0 output cell OUT#3 (not shown) and so on until the end-of-frame flag is encountered. However, for this example say that the end-of-frame flag is encountered and decoded at time L. The end of the frame indication is equivalent to an end-of-cell, and so the output cell ATM #2 is acknowledged back to the cell queue function as to be discarded. The output AAL0 cell OUT#2 is not yet full, however, and so is filled with HDLC frame delimiting flag values to both delimit the frame, and to pad out the rest of the output cell payload, as shown by the region 65. The cell is finally filled at time M at which point it may be transmitted to the frame network interface, and the process can begin again for the next input frame.

This process is summarised in the flow diagram of FIG. 5. Note that the end of an input can also occur when the end of a frame is detected within the input cell payload. In addition to the actions shown, the value of the input pointer is stored when the "retransmit cell" state is encountered. This value is compared against the current value of the input pointer in order to determine whether the data has already been processed and transmitted. In this way, previously unsent data can be recognised and sent to the frame network interface, thus avoiding erroneous duplication of any of the frame data.

In addition to being able to prevent data duplication completely, the present invention also provides for duplication of a predetermined number of bits which may be used to ensure that the data received at the frame network interface is assembled into frames in the right order. By duplicating a predetermined number of bits from the end of the data payload of a preceding cell onto the start of the data payload of the current cell, the frame network interface is able to ensure that the data is being assembled into frames in the correct order by looking for the duplicate sequences. The duplication is achieved by simply decrementing the stored input pointer value by the number of bits to be duplicated. All other operations are the same as previously described.

While the above described embodiment and variations thereon have been given on the basis of a transfer from fixed length packets to variable length packets, it will be appreciated that the method is of general application where the packets have to be inverted from one size to another be they of fixed length or not.

What is claimed is:

1. A method of transferring data from a packet-switched data communications network which uses data packets of a first size to a further packet-switched data communications network which uses data packets of a second size generally different to said first size, comprising the steps of:

queuing input data packets of said first size;

processing the data payloads of said input data packets received from said queue to line-encode said data so that it may be transmitted in said data packets of said second size;

generating output processed data packets of the same size as the input data packets of said first size for transmitting said processed data payloads to a first to second size data packets conversion device;

wherein the generating step comprises holding any input data packet of said first size in said input queue until all its data payload has been processed and passed into an output processed data packet and reprocessing the input data packet in the event that not all of its data payload has been so passed whereby the remainder of the data payload of said held packet is passed to the next output processed data packet, wherein the reprocessing step includes inhibiting any previously passed data from being placed into the next output processed data packet to prevent the erroneous duplication of said processed data.

2. A method according to claim 1 wherein said input and output processed data packets are ATM cells.

3. A method according to claim 1 wherein said line-encoding process uses the High-Level Data Link Control (HDLC) protocol to process the data into a format suitable for transmission as Frame Relay frames.

4. A method of transferring data from a packet-switched data communications network which uses data packets of a first size to a further packet-switched data communications network which uses data packets of a second size generally different to said first size, comprising the steps of:

queuing input data packets of said first size;

processing the data payloads of said input data packets received from said queue to line-encode said data so that it may be transmitted in said data packets of said second size;

generating output processed data packets of the same size as the input data packets of said first size for transmitting said processed data payloads to a first to second size data packets conversion device;

wherein the generating step comprises holding any input data packet of said first size in said input queue until all its data payload has been processed and passed into an output processed data packet and reprocessing the input data packet in the event that not all of its data payload has been so passed whereby the remainder of the data payload of said held packet is passed to the next output processed data packet, wherein the size of said data packets of a first size is fixed for all such packets and the size of said data packets of a second size is of variable length, said input and output processed data packets are ATM cells, said input ATM cells use adaptation layer 5.

5. A method of transferring data from a packet-switched data communications network which uses data packets of a first size to a further packet-switched data communications network which uses data packets of a second size generally different to said first size, comprising the steps of:

queuing input data packets of said first size;

processing the data payloads of said input data packets received from said queue to line-encode said data so that it may be transmitted in said data packets of said second size;

generating output processed data packets of the same size as the input data packets of said first size for transmitting said processed data payloads to a first to second size data packets conversion device;

wherein the generating step comprises holding any input data packet of said first size in said input queue until all its data payload has been processed and passed into an output processed data packet and reprocessing the input data packet in the event that not all of its data payload has been so passed whereby the remainder of the data payload of said held packet is passed to the next output processed data packet, wherein the size of said data packets of a first size is fixed for all such packets and the size of said data packets of a second size is of variable length, said input and output processed data packets are ATM cells, said output processed ATM cells use ATM adaptation layer 0.

6. A method according to claim 5 wherein said variable-length data packets are Frame Relay frames.

7. An apparatus for transferring data from a packet-switched data communications network which uses data packets of a first size to a further packet-switched data communications network which uses data packets of a second size generally different to said first size, comprising:

means for queuing input data packets of said first size;

means for processing the data payloads of said input data packets received from said queue to line-encode said data so that it may be transmitted in said data packets of said second size; and means for generating output processed data packets of the same size as the input data packets of said first size for transmitting said processed data payloads to a first to second size data packets conversion device;

wherein the generating means comprises means for holding any input data packet of said first size in said input queue until all its data payload has been processed and passed into an output processed data packet and the processing means is arranged to reprocess the input data packet in the event that not all of its data payload has been so passed whereby the remainder of the data payload of said held packet is passed to the next output processed data packet, wherein it includes means for inhibiting any previously passed data from being placed into the next output processed data packet to prevent the erroneous duplication of said processed data.

8. The apparatus according to claim 7, wherein said input and output processed data packets are ATM cells, and said data packets of a second size are Frame Relay frames.

9. The apparatus according to claim 7, wherein a scheduling function of the means for queuing input data packets of the first size ensures queued cells are read at an average rate that matches a fixed bandwidth of an output channel of the first to second size data packets conversion device.

* * * * *